US011427252B2

(12) United States Patent
Fukuda et al.

(10) Patent No.: US 11,427,252 B2
(45) Date of Patent: Aug. 30, 2022

(54) AUTOMATIC DRIVING SYSTEM (71) Applicant: TOYOTA JIDOSHA KABUSHIKI KAISHA, Toyota (JP)

(72) Inventors: Hiroki Fukuda, Shizuoka-ken (JP); Shota Fujii, Susono (JP); Kenichiro Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 509 days.

(21) Appl. No.: 16/440,083

(22) Filed: Jun. 13, 2019

(65) Prior Publication Data
US 2020/0070889 A1 Mar. 5, 2020

(30) Foreign Application Priority Data

Aug. 28, 2018 (JP) .............................. JP2018-159631

(51) Int. Cl.
*B62D 15/02* (2006.01)
*B60W 30/18* (2012.01)
(Continued)

(52) U.S. Cl.
CPC ......... *B62D 15/0255* (2013.01); *B60W 10/18* (2013.01); *B60W 10/20* (2013.01); *B60W 30/12* (2013.01); *B60W 30/143* (2013.01); *B60W 30/18163* (2013.01); *G05D 1/0088* (2013.01); *G08G 1/16* (2013.01); *B60W 2554/801* (2020.02)

(58) Field of Classification Search
CPC ........... B60W 10/20; B60W 30/18163; B60W 30/12; B60W 30/143; B60W 10/18; B60W 2554/801; G08G 1/16; G08G 1/167; B62D 15/0255; G05D 1/0088
See application file for complete search history.

(56) References Cited

U.S. PATENT DOCUMENTS

| 10,011,281 B1* | 7/2018 | Kang .................. B60W 50/082 |
| 2006/0100783 A1* | 5/2006 | Haberer ................. G05D 1/024 |
| | | 701/301 |

(Continued)

FOREIGN PATENT DOCUMENTS

| JP | 2012-123606 A | 6/2012 |
| JP | 2017-140857 A | 8/2017 |

*Primary Examiner* — Khoi H Tran
*Assistant Examiner* — Rodney P King
(74) *Attorney, Agent, or Firm* — Sughrue Mion, PLLC (57) ABSTRACT

An automatic driving system that is mounted in a vehicle includes: an information acquiring device configured to acquire driving environment information indicating a driving environment of the vehicle; and a running control device configured to execute lane change control from a first lane to a second lane, and set a lane change time which is a time required for lane change The running control device is configured to set an initial value of the lane change time, determine whether a moving object having a highest degree of approach to the vehicle is present in the second lane, and change the initial value based on a relative position of the moving object with respect to the vehicle and a relative speed of the vehicle with respect to the moving object when it is determined that the moving object having the highest degree of approach is present in the second lane.

6 Claims, 8 Drawing Sheets

(51) Int. Cl.
*G08G 1/16* (2006.01)
*G05D 1/00* (2006.01)
*B60W 30/12* (2020.01)
*B60W 10/18* (2012.01)
*B60W 30/14* (2006.01)
*B60W 10/20* (2006.01)

(56) References Cited

U.S. PATENT DOCUMENTS

2015/0161895 A1* 6/2015 You ................. B60W 30/18163
  701/70
2019/0047561 A1* 2/2019 Nishiguchi ........... B60W 30/12
2019/0126919 A1* 5/2019 Sundar Pal ....... B60W 30/0956

* cited by examiner

AUTOMATIC DRIVING SYSTEM

INCORPORATION BY REFERENCE

The disclosure of Japanese Patent Application No. 2018-159631 filed on Aug. 28, 2018 including the specification, drawings and abstract is incorporated herein by reference in its entirety.

BACKGROUND

1. Technical Field

The present disclosure relates to an automatic driving system.

2. Description of Related Art

Japanese Unexamined Patent Application Publication No. 2017-140857 (JP 2017-140857 A) discloses a vehicle control system that automatically executes control of lane change from a first lane to a second lane. This system sets a time (hereinafter also referred to as an "LC time") required for lane change based on the lane change control according to a vehicle speed. Specifically, the LC time is set to a longer time as the vehicle speed decreases when the vehicle speed is lower than a first threshold value. The LC time is set to a longer time as the vehicle speed increases when the vehicle speed is higher than a second threshold value.

The second threshold value is greater than the first threshold value. That is, according to this system, the LC time increases as the vehicle speed decreases at the time of running at a low speed. Accordingly, a rotation angle of a steering wheel during execution of lane change control is limited. According to this system, the LC time increases as the vehicle speed increases at the time of running at a high speed. Accordingly, acceleration in a lateral direction during execution of lane change control is limited. As a result, a feeling of insecurity or a feeling of uneasiness which is given to a driver of a vehicle is reduced.

SUMMARY

However, the presence of a moving object around the vehicle is not reflected in the LC time. Accordingly, there is a likelihood that a feeling of insecurity or a feeling of uneasiness which is given to a driver will not be satisfactorily reduced simply by setting the LC time according to the vehicle speed.

The disclosure provides a technique for reducing a feeling of insecurity or a feeling of uneasiness which is given to a driver during execution of control of lane change from a first lane to a second lane.

A first aspect of the disclosure provides an automatic driving system that is mounted in a vehicle, including: an information acquiring device configured to acquire driving environment information indicating a driving environment of the vehicle; and a running control device configured to execute lane change control from a first lane to a second lane during automatic driving of the vehicle, and perform a setting process of setting a lane change time which is a time required for lane change based on the lane change control based on the driving environment information. The running control device is configured to, in the setting process, set an initial value of the lane change time, determine whether a moving object having a highest degree of approach to the vehicle is present in the second lane, and change the initial value based on a relative position of the moving object with respect to the vehicle and a relative speed of the vehicle with respect to the moving object when it is determined that the moving object having the highest degree of approach is present in the second lane.

According to this configuration, when it is determined that a moving object having the highest degree of approach to the vehicle is present in the second lane, the initial value of the lane change time is changed based on the relative position of the moving object and the relative speed of the vehicle with respect to the moving object. Accordingly, in comparison with a case in which the lane change time is set according to a vehicle speed, it is possible to reduce a feeling of insecurity or a feeling of uneasiness which is given to a driver.

In the first aspect, in the setting process, the running control device may change the initial value in an extending direction when the relative position is behind the vehicle and the relative speed is greater than a first threshold value which is positive. In the setting process, the running control device may change the initial value in a shortening direction when the relative position is behind the vehicle and the relative speed is negative.

In the first aspect, in the setting process, the running control device may change the initial value in an extending direction when the relative position is in front of the vehicle and the relative speed is less than a second threshold value which is negative. In the setting process, the running control device may change the initial value in a shortening direction when the relative position is in front of the vehicle and the relative speed is positive.

In the first aspect, in the setting process, the running control device may change the initial value in a shortening direction when the relative position is behind the vehicle and the relative speed is greater than a first threshold value which is positive. In the setting process, the running control device may change the initial value in a shortening direction when the relative position is behind the vehicle and the relative speed is negative.

In the first aspect, in the setting process, the running control device may change the initial value in a shortening direction when the relative position is in front of the vehicle and the relative speed is less than a second threshold value which is negative. In the setting process, the running control device may change the initial value in a shortening direction when the relative position is in front of the vehicle and the relative speed is positive.

According to the configurations, the initial value is changed in the extending direction or the shortening direction based on a combination of the relative position and the relative speed. Accordingly, in comparison with a case in which the lane change time is set according to the vehicle speed, it is possible to reduce a feeling of uneasiness which is given to a driver.

In the first aspect, in the setting process, the running control device may determine whether the moving object is present in a third lane which is adjacent to the second lane when it is determined that the moving object having the highest degree of approach is not present in the second lane. In the setting process, the running control device may change the initial value in an extending direction when it is determined that the moving object having the highest degree of approach is present in the third lane.

According to the above configuration, when it is determined that a moving object having the highest degree of approach is present in the third lane, the initial value is changed in the extending direction. Accordingly, execution of lane change control can strongly emphasize the moving object. As a result, it is possible to give a feeling of security that lane change control will be safely executed to a driver.

In the first aspect, in the setting process, the running control device may determine whether a moving object is present in the first lane when the initial value has been changed. In the setting process, the running control device may determine whether an absolute value of the relative speed of the vehicle with respect to the moving object is greater than a third threshold value when it is determined that a moving object is present in the first lane. In the setting process, the running control device may re-change the changed initial value in a shortening direction when it is determined that the absolute value is greater than the third threshold value.

According to this configuration, when the absolute value of the relative speed of the vehicle with respect to a moving object in the first lane is greater than the third threshold value, the initial value is re-changed in the shortening direction. When the absolute value is greater than the third threshold value, it means that a distance between the moving object in the first lane and the vehicle is decreasing. Accordingly, when re-change of the initial value is performed in the shortening direction in this case, it is possible to give a feeling of security that execution of lane change control will be rapidly completed to a driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. When numerical values such as numbers, numerals, amounts, and ranges, of elements are mentioned in the following embodiment, the disclosure is not limited to the mentioned numerical values unless mentioned explicitly or unless the numerical values are clearly restrictive in principle. Structures, steps, or the like which will be described in the following embodiment are not essential for the disclosure unless mentioned explicitly or unless apparently restrictive in principle.

First Embodiment

Figure 1:
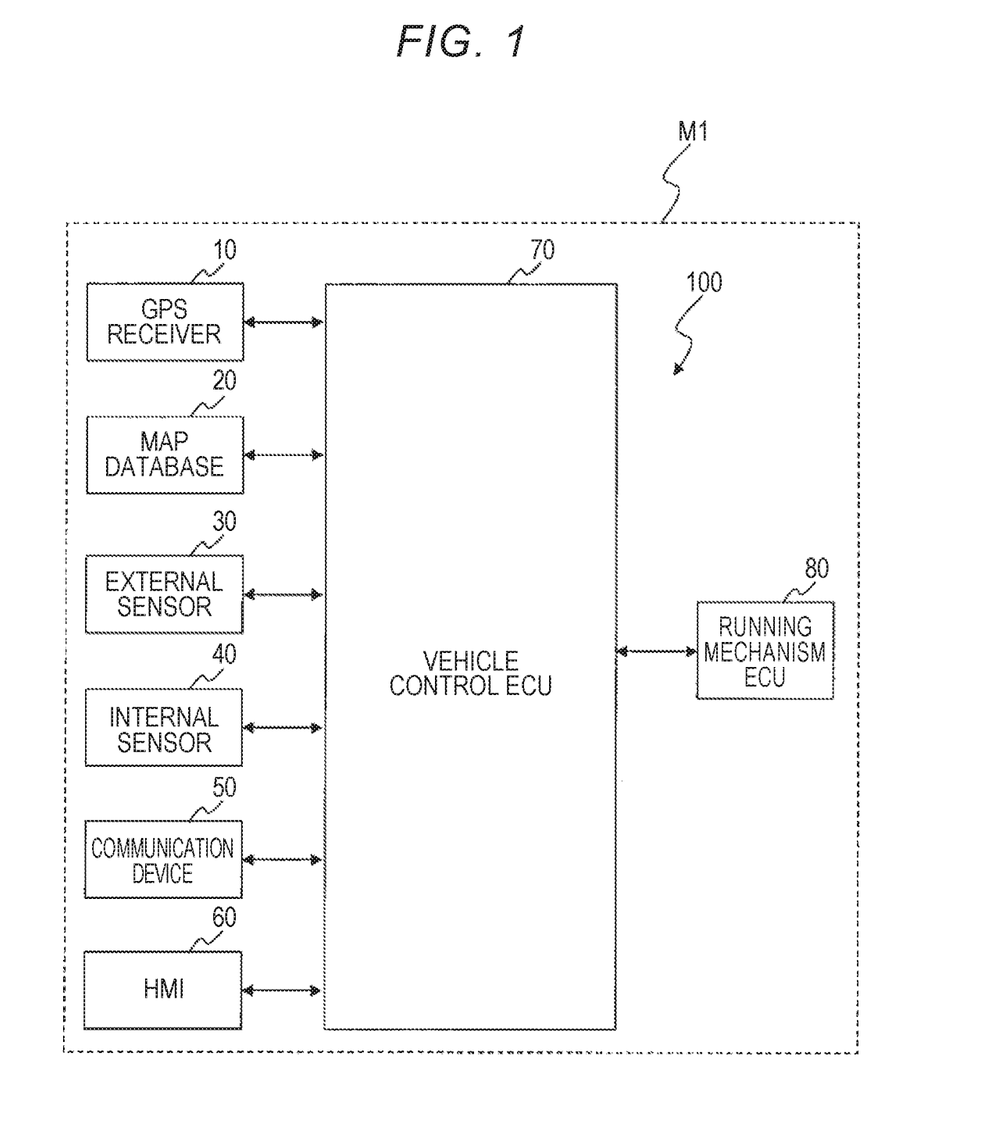
FIG. 1 is a block diagram illustrating an example of a configuration of an automatic driving system according to embodiments of the disclosure.

First, a first embodiment of the disclosure will be described with reference to FIGS. 1 to 9.
1. Entire Configuration of Automatic Driving System FIG. 1 is a block diagram illustrating an example of a configuration of an automatic driving system 100 according to the first embodiment. This system is mounted in a vehicle and controls automatic driving of the vehicle. A vehicle in which this system is mounted (hereinafter also referred to as a "vehicle M1") is, for example, a vehicle using an internal combustion engine such as a diesel engine or a gasoline engine as a power source, an electric vehicle using an electric motor as a power source, or a hybrid vehicle including an internal combustion engine and an electric motor. The electric motor is driven by a battery such as a secondary battery, a hydrogen fuel cell, a metal fuel cell, or an alcohol fuel cell.

The automatic driving system 100 illustrated in FIG. 1 includes a Global Positioning System (GPS) receiver 10, a map database 20, an external sensor 30, an internal sensor 40, a communication device 50, a Human-Machine Interface (HMI) unit 60, a vehicle control electronic control unit (hereinafter also referred to as a "vehicle control ECU") 70, and a running mechanism electronic control unit (hereinafter also referred to as a "running mechanism ECU") 80.

The GPS receiver 10 is a device that receives signals from three or more GPS satellites. The GPS receiver 10 calculates a position and an orientation (a direction) of the vehicle M1 based on the received signals. The GPS receiver 10 transmits the calculated information (hereinafter also referred to as "position and orientation information") to the vehicle control ECU 70.

Data of map information is stored in the map database 20. The data of map information includes data of positions of roads, intersections, merging junctions, branching junctions, and the like, data of road shapes (for example, a curve, a type of a straight line, a road width, a road gradient, and a curvature of a curve), data of road types (for example, an expressway, a toll road, and a national highway), and data of boundary positions of each lane (a boundary position is expressed, for example, by a set of a plurality of points or a plurality of lines). The map database 20 is stored in a predetermined storage device (such as a hard disk or a flash memory).

The external sensor 30 is a device that detects conditions around the vehicle M1. Examples of the external sensor 30 include a Laser Imaging Detection and Ranging (LIDAR), a radar, a camera, and a luminance sensor. The LIDAR detects an object around the vehicle M1 using light. The radar detects an object around the vehicle M1 using radio waves. The camera images the conditions around the vehicle M1. The luminance sensor detects the luminance at the position of the vehicle M1. The external sensor 30 transmits the detected information (hereinafter also referred to as "external sensor information") to the vehicle control ECU 70.

The internal sensor 40 is a device that detects a running state of the vehicle M1. Examples of the internal sensor 40 include a vehicle speed sensor, a brake sensor, an accelerator operation sensor, a steering angle sensor, and a winker sensor. The vehicle speed sensor detects a running speed of the vehicle M1 (that is, a vehicle speed V1). The brake sensor detects an amount of depression of a brake pedal by a driver. The accelerator operation sensor detects an amount of depression of an accelerator pedal by a driver. The steering angle sensor detects a rotation angle (a steering angle) of a steering wheel. The winker sensor detects a direction of operation of a winker lever by a driver. The internal sensor 40 transmits the detected information (hereinafter also referred to as "internal sensor information") to the vehicle control ECU 70.

The communication device 50 performs V2X communication (vehicle-to-vehicle communication and road-to-vehicle communication). Specifically, the communication device 50 performs V2V communication (vehicle-to-vehicle communication) with another vehicle. The communication device 50 performs V2I communication (road-to-vehicle communication) with neighboring infrastructure. The communication device 50 can acquire information on an environment around the vehicle M1 by V2X communication. The communication device 50 transmits the acquired information (hereinafter also referred to as "communication information") to the vehicle control ECU 70.

The HMI unit 60 is an interface that provides information to a driver and receives information from a driver. For example, the HMI unit 60 includes an input device, a display device, a speaker, and a microphone. Examples of the input device include a touch panel, a keyboard, a switch, and buttons. A driver can input information to the HMI unit 60 using the input device. The HMI unit 60 transmits information input from a driver (hereinafter also referred to as "driver information") to the vehicle control ECU 70.

The vehicle control ECU 70 executes automatic driving control for controlling automatic driving of the vehicle M1. Typically, the vehicle control ECU 70 is a microcomputer including a processor, a memory, and an input and output interface. The vehicle control ECU 70 receives a variety of information via the input and output interface. The vehicle control ECU 70 executes automatic driving control based on the received information. Specifically, the vehicle control ECU 70 makes a running plan for the vehicle M1 and outputs information to the running mechanism ECU 80 such that the vehicle M1 runs in accordance with the running plan.

The running mechanism ECU 80 is a microcomputer having the same configuration as the vehicle control ECU 70. The running mechanism ECU 80 includes a plurality of ECUs. These ECUs control various running mechanisms (not illustrated) for causing the vehicle M1 to run in accordance with information input from the vehicle control ECU 70. These running mechanisms are electronically controlled and include a running driving force output device, a steering device, and a brake device. The running driving force output device is a power source that generates a running driving force. The steering device turns vehicle wheels. The brake device generates a braking force.

2. Configuration of Vehicle Control ECU 70

Figure 2:
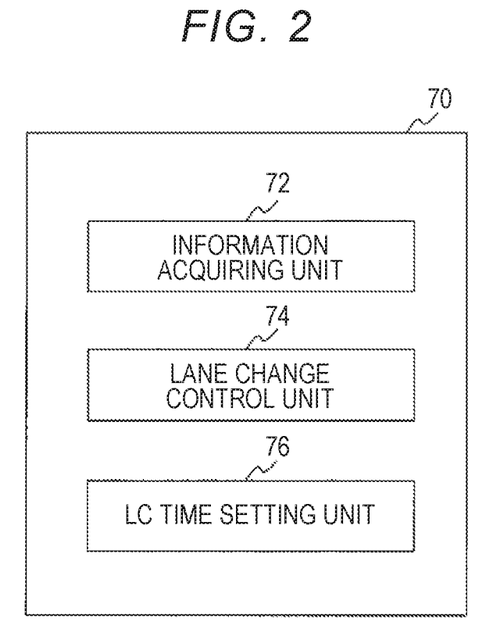
FIG. 2 is a block diagram illustrating an example of a functional configuration of a vehicle control ECU illustrated in FIG. 1.

FIG. 2 is a block diagram illustrating an example of a functional configuration of the vehicle control ECU 70 illustrated in FIG. 1. In the first embodiment, particularly, "lane change control" of automatic driving control by the vehicle control ECU 70 will be considered. Lane change control is control for changing a lane in which the vehicle M1 runs during execution of automatic driving of the vehicle M1. In the following description, a lane before being changed may be referred to as a "first lane" and a lane after being changed may be referred to as a "second lane."

The vehicle control ECU 70 includes an information acquiring unit 72, a lane change control unit 74, and an LC time setting unit 76 as functional blocks associated with lane change control. These functional blocks are embodied by causing the processor of the vehicle control ECU 70 to execute a control program stored in the memory. The control program may be stored in a computer-readable recording medium.

2.1 Information Acquiring Unit 72

The information acquiring unit 72 performs an information acquiring process. The information acquiring process is a process of acquiring driving environment information which is required for lane change control. The driving environment information is a collective name for position and orientation information, map information, external sensor information, internal sensor information, communication information, and driver information which are acquired by the information acquiring unit 72.

In the information acquiring process, the information acquiring unit 72 acquires position and orientation information.

In the information acquiring process, the information acquiring unit 72 acquires map information and generates lane information on lanes around the vehicle M1. The lane information includes arrangements (positions, shapes, and gradients) of lanes on a map. The information acquiring unit 72 ascertains merging, branching, and crossing of lanes based on the generated lane information. The information acquiring unit 72 calculates a lane curvature, a lane width, and the like based on the generated lane information.

In the information acquiring process, the information acquiring unit 72 acquires external sensor information and generates object information on objects around the vehicle M1. Objects around the vehicle M1 include a moving object and a stationary object. Examples of a moving object include a neighboring vehicle, a motorcycle, a bicycle, and a pedestrian. Information on a moving object includes a position, a speed, and a size of a moving object. Examples of a stationary object include a road-side object, a white line, and a marker. Information on a stationary object includes a position and a size of a stationary object.

In the information acquiring process, the information acquiring unit 72 acquires internal sensor information. Examples of internal sensor information include a running speed of the vehicle M1, an amount of depression of a brake pedal, an amount of depression of an accelerator pedal, a rotation angle of a steering wheel, and an operating direction of a winker lever.

In the information acquiring process, the information acquiring unit 72 acquires communication information. Communication information is information which is delivered from infrastructure or the like. Examples of communication information include weather information, roadwork section information, accident information, and traffic regulation information.

In the information acquiring process, the information acquiring unit 72 acquires driver information. Examples of driver information include an age or a driving career of a driver. The driver information may include various settings selected by a driver. Various settings may include setting of a lane change mode (that is, a first mode and a second mode). A driver can register driver information in the automatic driving system 100 using the input device of the HMI unit 60 in advance.

2.2 Lane Change Control Unit 74

The lane change control unit 74 performs a lane change control process based on the driving environment information acquired in the information acquiring process.

The lane change control process is a process of automatically executing lane change control. In the lane change control process, the lane change control unit 74 first determines whether lane change control is to be executed based on the driving environment information.

For example, the lane change control unit 74 may recognize branching or merging of lanes in front of the vehicle M1 based on position and orientation information and lane information. Alternatively, the lane change control unit 74 may recognize branching or merging of lanes based on external sensor information. In this case, the lane change control unit 74 determines that lane change control is to be executed in a branching zone or a merging zone.

For example, the lane change control unit 74 may recognize an obstacle in front of the vehicle M1 based on external sensor information. Examples of an obstacle include a stopped vehicle, a low-speed running vehicle, and a fallen object. In this case, the lane change control unit 74 determines that lane change control is to be executed in order to avoid the obstacle.

For example, the lane change control unit 74 may recognize a roadwork section or a vehicle involved in an accident in front of the vehicle M1 based on the position and orientation information and the received information. In this case, the lane change control unit 74 determines that lane change control is to be executed in order to avoid the roadwork section or the vehicle involved in an accident.

When it is determined that lane change control is to be executed, the lane change control unit 74 determines control values of the running mechanisms based on an LC time. For example, the lane change control unit 74 sets a target steering angle and a target vehicle speed based on the LC time and determines control values of the steering device and the running driving force output device. In a case of lane change control in which the vehicle speed is kept constant, the lane change control unit 74 sets only the target steering angle based on the LC time and determines the control value of the steering device. The lane change control unit 74 transmits the determined control values to the running mechanism ECU 80.

2.3 LC Time Setting Unit

The LC time setting unit 76 performs an LC time setting process based on the driving environment information acquired in the information processing process. The LC time setting process is a process of setting an LC time which is used to determine the control value, which is performed by the lane change control unit 74.

Figure 3:
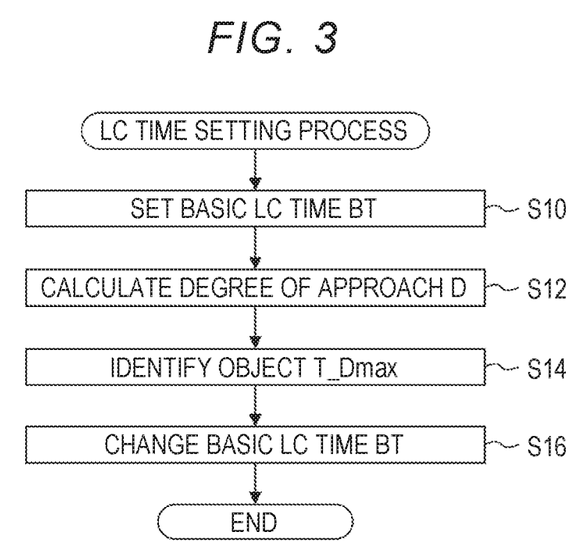
FIG. 3 is a flowchart illustrating a flow of an LC time setting process.

FIG. 3 is a flowchart illustrating a flow of the LC time setting process. In the LC time setting process, first, an initial value of the LC time (hereinafter also referred to as a "basic LC time BT") is set (Step S10). The basic LC time BT is set, for example, based on the vehicle speed V1. The basic LC time BT may be set based on lane information or communication information. The basic LC time BT may be set to a fixed value.

After the basic LC time BT has been set, a degree of approach D to the vehicle M1 is calculated in the LC time setting process (Step S12). The degree of approach D is calculated, for example, based on Equation (1) which is expressed using a collision margin time TTC (Time-To-Collision) and an inter-vehicle time THW (Time-HeadWay). Coefficients α and β are constants.

$$D = \alpha/\text{THW} + \beta/|\text{TTC}| \quad (1)$$

THW=distance L from vehicle M1 to object/vehicle speed V1

TTC=distance L/relative speed V2 of vehicle M1 with respect to object

V2=speed of object V3−vehicle speed V1

After the degree of approach D has been calculated, an object T_Dmax is identified (Step S14). The object T_Dmax is a moving object having a largest degree of approach D.

After the object T_Dmax has been identified, the basic LC time BT is changed (Step S16). The change of the basic LC time BT is performed by a determination process based on the position of the object T_Dmax and the relative speed V2_Dmax. The relative speed V2_Dmax is a relative speed of the vehicle M1 with respect to the object T_Dmax. In the following description, the determination process for changing the basic LC time BT is also referred to as a "change determining process."

(1) First Example of Change Determining Process

Figure 4:
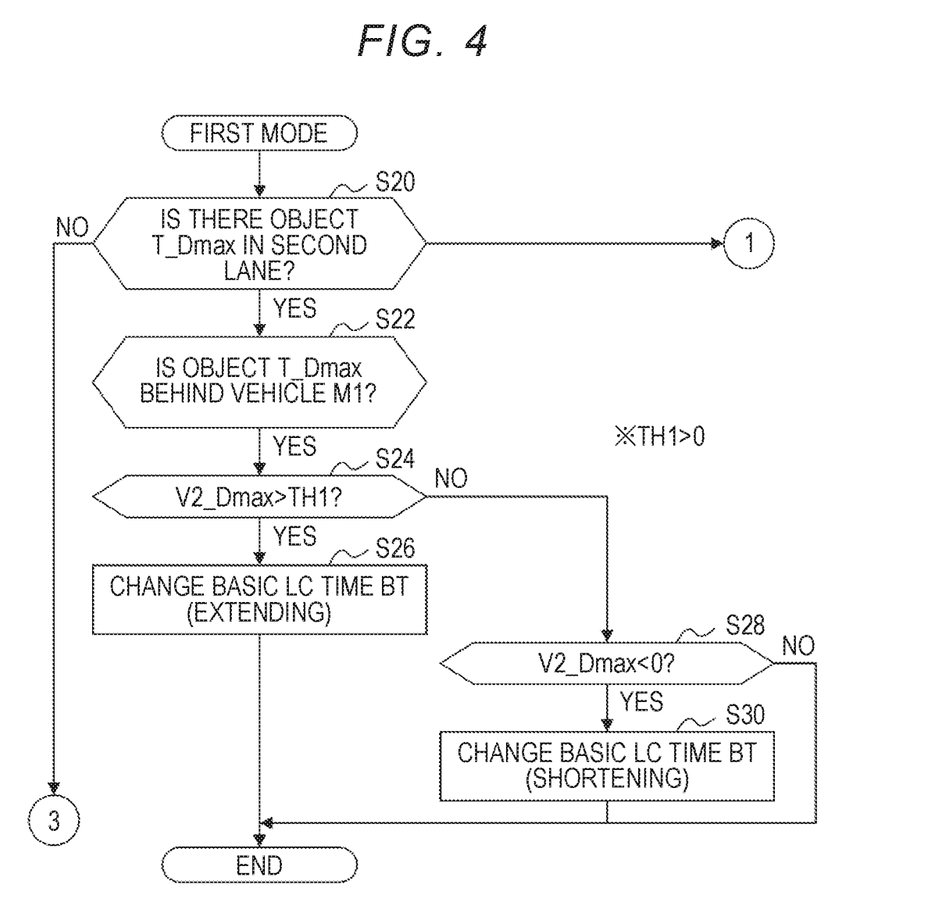
FIG. 4 is a flowchart illustrating a flow of a first example of a determination process (a change determining process) for changing a basic LC time BT.
Figure 5:
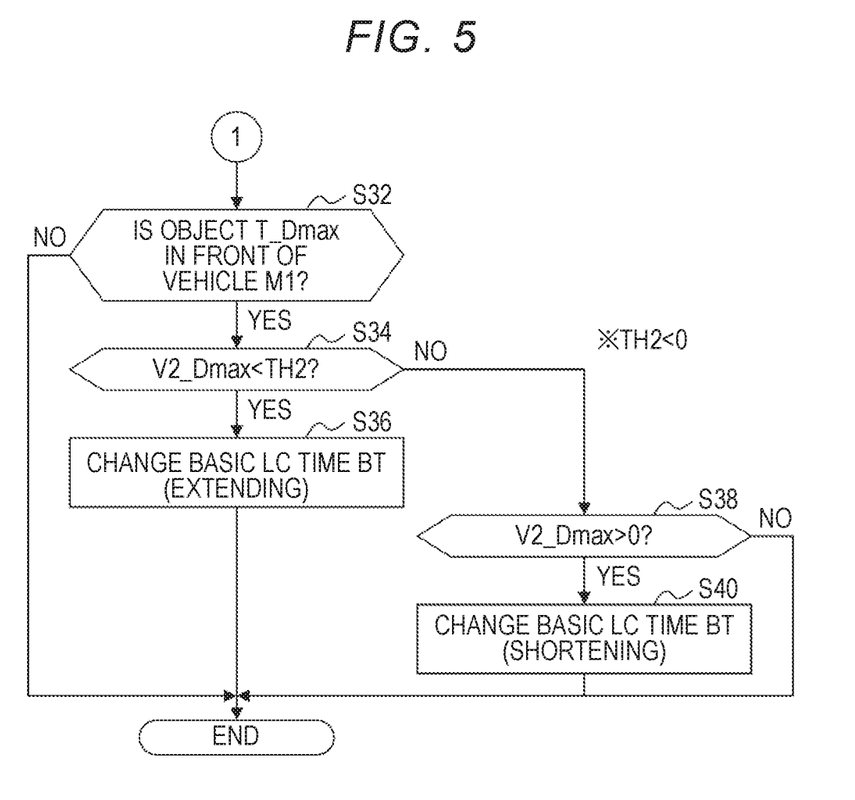
FIG. 5 is a flowchart illustrating a flow of the first example of the change determining process.
Figure 6:
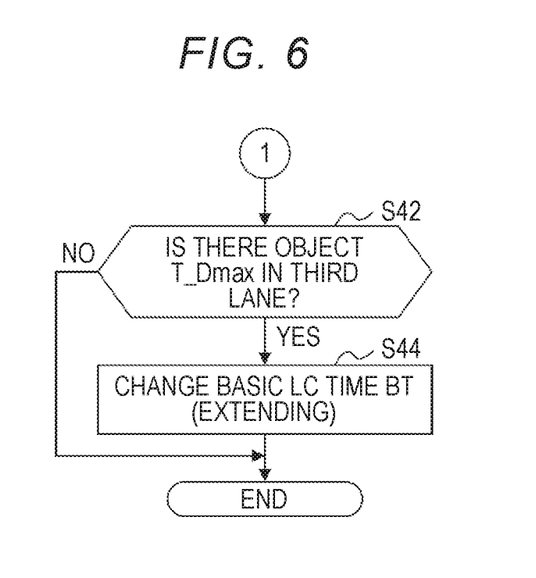
FIG. 6 is a flowchart illustrating a flow of the first example of the change determining process.

FIGS. 4 to 6 are flowcharts illustrating a flow of a first example of the change determining process. The first example corresponds to the first mode of lane change. In the first example, first, it is determined whether there is an object T_Dmax in the second lane (Step S20). The determination of Step S20 is performed based on external sensor information. A range in the second lane which is determined in Step S20 is set based on the vehicle speed V1. When the determination result of Step S20 is negative, the process of Step S42 (details of which will be described later) illustrated in FIG. 6 is performed.

When the determination result of Step S20 is positive, it is determined whether the object T_Dmax is present behind the vehicle M1 (Step S22). The determination of Step S22 is performed based on external sensor information. For example, when the object T_Dmax is a following vehicle of the vehicle M1, it is determined that the object T_Dmax is present behind the vehicle M1. When the determination result of Step S22 is negative, the process of Step S32 (details of which will be described later) illustrated in FIG. 5 is performed.

When the determination result of Step S22 is positive, it is determined whether the relative speed V2_Dmax is greater than a first threshold value TH1 (Step S24). The first threshold value TH1 is a positive value which is set in advance. Accordingly, when the relative speed V2_Dmax is a positive value and is greater than the first threshold value TH1, the determination result of Step S24 is positive. When the determination result of Step S22 is positive and the relative speed V2_Dmax is a positive value, it means that the object T_Dmax approaches the vehicle M1.

When the determination result of Step S24 is positive, the basic LC time BT is changed in an extending direction (Step S26). This change is performed by multiplying the basic LC time BT by a predetermined correction factor γ (γ >1). The correction factor γ may be set to vary according to the vehicle speed V1.

When the determination result of Step S24 is negative, it is determined whether the relative speed V2_Dmax is a negative value (Step S28). The case in which the determination result of Step S24 is negative includes a case in which the relative speed V2_Dmax is a positive value less than the first threshold value TH1 and a case in which the relative speed V2_Dmax is a negative value. In the former case, the change determining process ends.

In the latter case, that is, when the determination result of Step S28 is positive, the basic LC time BT is changed in a shortening direction (Step S30). This change is performed by multiplying the basic LC time BT by a predetermined correction factor δ (δ<1). The correction factor δ may be set to vary according to the vehicle speed V1. When the determination result of Step S28 is positive, it means that the vehicle M1 goes away from the object T_Dmax.

In Step S32 illustrated in FIG. 5, it is determined whether an object T_Dmax is present in front of the vehicle M1. The determination of Step S32 is performed based on external sensor information. For example, when the object T_Dmax is a preceding vehicle of the vehicle M1, it is determined that the object T_Dmax is present in front of the vehicle M1. When the determination result of Step S32 is negative, the change determining process ends.

When the determination result of Step S32 is positive, it is determined whether a relative speed V2_Dmax is less than a second threshold value TH2 (Step S34). The second threshold value TH2 is a negative value which is set in advance. Accordingly, when the relative speed V2_Dmax is a negative value and is less than the second threshold value TH2, the determination result of Step S34 is positive. When the determination result of Step S32 is positive and the relative speed V2_Dmax is a negative value, it means that the vehicle M1 approaches the object T_Dmax.

When the determination result of Step S34 is positive, the basic LC time BT is changed in the extending direction (Step S36). This change is performed by multiplying the basic LC time BT by a predetermined correction factor ε (ε>1). The correction factor c may be set to vary according to the vehicle speed V1.

When the determination result of Step S34 is negative, it is determined whether the relative speed V2_Dmax is a positive value (Step S38). The case in which the determination result of Step S34 is negative includes a case in which the relative speed V2_Dmax is a negative value greater than the second threshold value TH2 and a case in which the relative speed V2_Dmax is a positive value. In the former case, the change determining process ends.

In the latter case, that is, when the determination result of Step S38 is positive, the basic LC time BT is changed in the shortening direction (Step S40). This change is performed by multiplying the basic LC time BT by a predetermined correction factor ζ (ζ<1). The correction factor ζ may be set to vary according to the vehicle speed V1. When the determination result of Step S38 is positive, it means that the object T_Dmax goes away from the vehicle M1.

Figure 7:
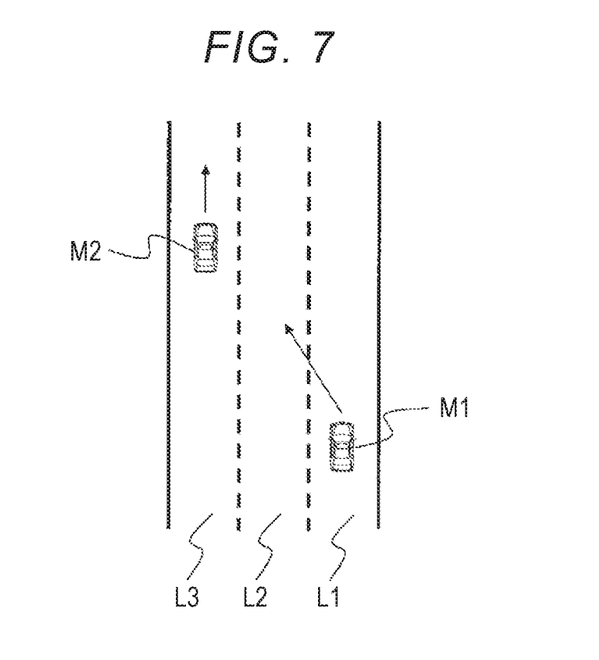
FIG. 7 is a diagram illustrating details of the determination of Step S42 in FIG. 6.

In Step S42 illustrated in FIG. 6, it is determined whether there is an object T_Dmax in a third lane. The determination of Step S42 is performed based on external sensor information. A range in the third lane which is determined in Step S42 is set based on the vehicle speed V1. Details of the determination of Step S42 will be described below with reference to FIG. 7. In FIG. 7, it is assumed that lane change control from the first lane L1 to the second lane L2 by the vehicle M1 is performed. The third lane L3 is a lane adjacent to the second lane L2.

When there is no object T_Dmax or when there is no third lane L3, the change determining process ends. When there is an object T_Dmax in the first lane L1, the change determining process also ends. In FIG. 7, a vehicle M2 which is an object T_Dmax is present in the third lane L3. In this case, the determination result of Step S42 is positive.

When the determination result of Step S42 is positive, the basic LC time BT is changed in the extending direction (Step S44). This change is performed by multiplying the basic LC time BT by a predetermined correction factor η (η>1). The correction factor η may be set to vary according to the vehicle speed V1.

(2) Second Example of Change Determining Process

Figure 8:
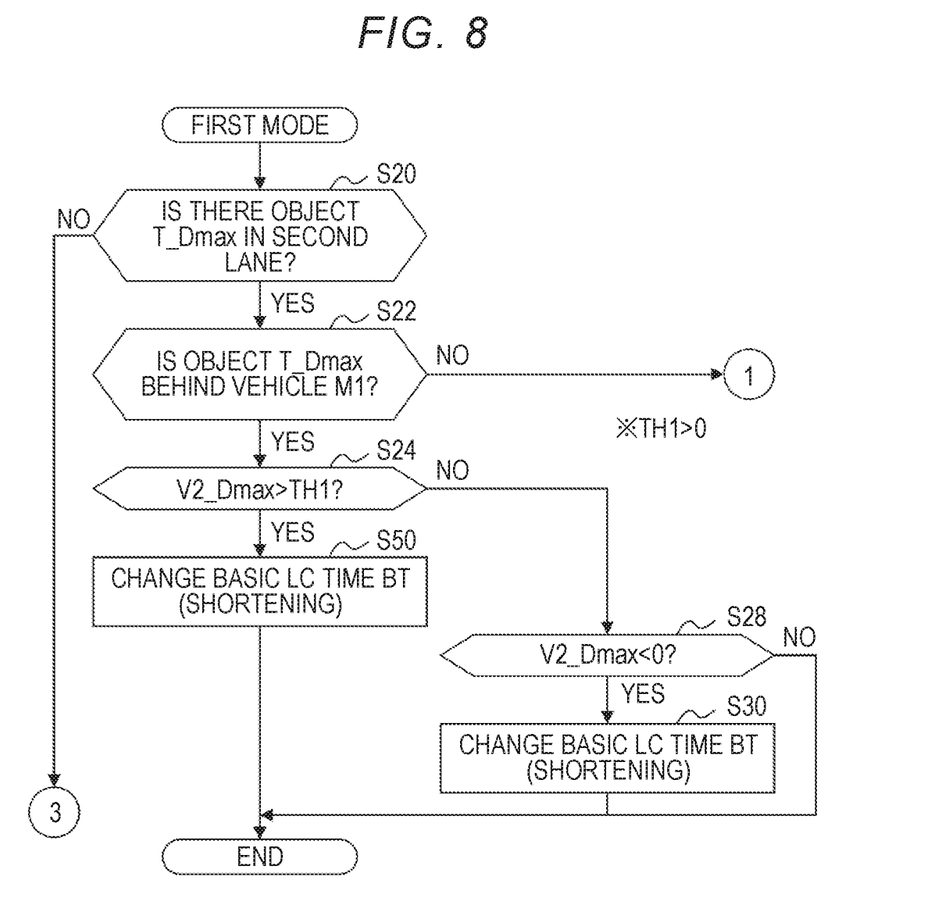
FIG. 8 is a flowchart illustrating a flow of a second example of the change determining process.
Figure 9:
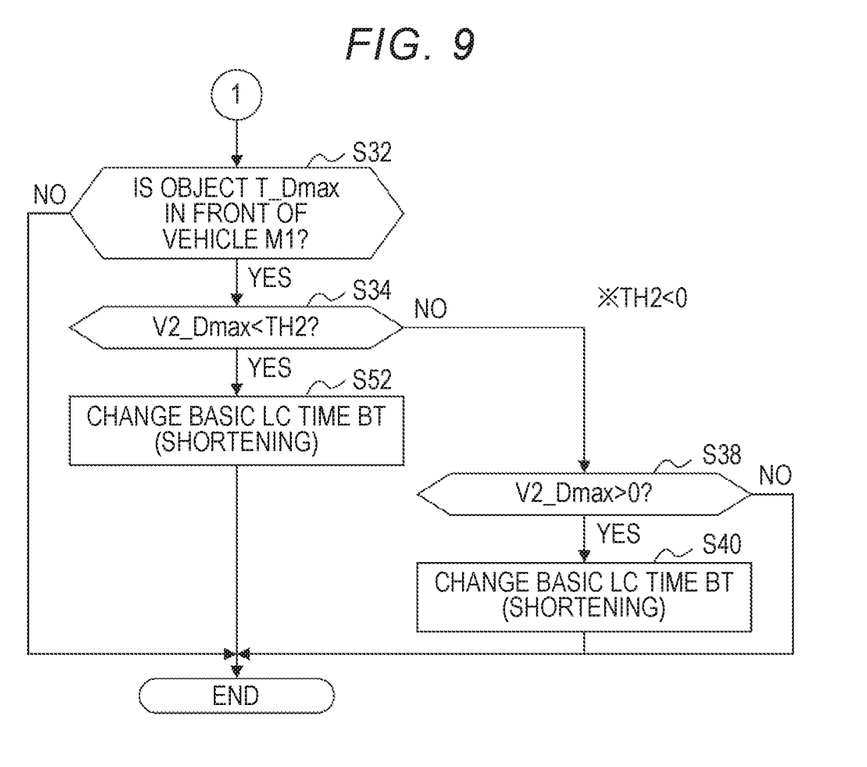
FIG. 9 is a flowchart illustrating a flow of the second example of the change determining process.

FIGS. 8 and 9 are flowcharts illustrating a flow of a second example of the change determining process. The second example corresponds to a second mode of lane change. The second example is the same as the first example, except that only a part of the process details in the first example is changed. Accordingly, the process details common thereto will not be described. The process details in FIG. 6 are applied to the second example in addition to the first example.

As illustrated in FIG. 8, in the second example, when the determination result of Step S24 is positive, the basic LC time BT is changed in the shortening direction (Step S50). This change is performed by multiplying the basic LC time BT by a predetermined correction factor θ (θ>1). The correction factor θ may be set to vary according to the vehicle speed V1.

As illustrated in FIG. 9, in the second example, when the determination result of Step S34 is positive, the basic LC time BT is changed in the shortening direction (Step S52). This change is performed by multiplying the basic LC time BT by a predetermined correction factor κ (κ>1). The correction factor κ may be set to vary according to the vehicle speed V1.

3. Advantageous Effects

In the automatic driving system according to the first embodiment, the basic LC time BT is changed by performing the change determining process. This change direction (that is, the extending direction or the shortening direction) is determined based on a position of an object T_Dmax and a relative speed V2. That is, the change direction is determined based on a combination of a position condition of an object T_Dmax and a relative speed condition of the vehicle M1 with respect to the object T_Dmax. With the system in which the basic LC time BT is changed in combination of the conditions, the following advantageous effects can be expected.

Position condition: An object T_Dmax is present in the second lane and behind the vehicle M1.

Relative speed condition: The relative speed V2 is greater than the first threshold value TH1.

(First example) The basic LC time is changed in the extending direction (see Step S26 in FIG. 4).

When the basic LC time is changed in the extending direction, execution of lane change control can strongly emphasize the object T_Dmax. Accordingly, in a situation in which the object T_Dmax approaches the vehicle M1, a feeling of security that lane change control will be safely performed can be given to a driver.

Position condition: An object T_Dmax is present in the second lane and behind the vehicle M1.

Relative speed condition: The relative speed V2 is greater than the first threshold value TH1.

Second Example

The basic LC time is changed in the shortening direction (see Step S50 in FIG. 8).

When the basic LC time is changed in the shortening direction, execution of lane change control can be completed before a distance L_Dmax between the vehicle M1 and the object T_Dmax decreases. Accordingly, in a situation in which the object T_Dmax approaches the vehicle M1, a feeling of security that execution of lane change control will be rapidly completed can be given to a driver.

Position condition: An object T_Dmax is present in the second lane and in front of the vehicle M1.

Relative speed condition: The relative speed V2 is less than the second threshold value TH2.

First Example

The basic LC time is changed in the extending direction (see Step S36 in FIG. 5).

When the basic LC time is changed in the extending direction, the distance L_Dmax can be slowly decreased. Accordingly, in a situation in which the vehicle M1 approaches the object T_Dmax, a feeling of security that lane change control will be safely performed can be given to a driver.

Position condition: An object T_Dmax is present in the second lane and in front of the vehicle M1.

Relative speed condition: The relative speed V2 is less than the second threshold value TH2.

Second Example

The basic LC time is changed in the shortening direction (see Step S52 in FIG. 9).

When the basic LC time is changed in the shortening direction, execution of lane change control can be completed before the distance L_Dmax decreases. Accordingly, in a situation in which the vehicle M1 approaches the object T_Dmax, a feeling of security that execution of lane change control will be rapidly completed can be given to a driver of the vehicle M1.

Position condition: An object T_Dmax is present in the second lane and behind the vehicle M1.

Relative speed condition: The relative speed V2 is less than 0.

First and Second Examples

The basic LC time is changed in the shortening direction (see Step S30 in FIGS. 4 and 8).

When the basic LC time is changed in the shortening direction, execution of lane change control can be completed for a short time in a situation in which the vehicle M1 goes away from the object T_Dmax, Position condition: An object T_Dmax is present in the second lane and behind the vehicle M1.

Relative speed condition: The relative speed V2 is greater than 0.

First and Second Examples

The basic LC time is changed in the shortening direction (see Step S40 in FIGS. 5 and 9).

When the basic LC time is changed in the shortening direction, execution of lane change control can be completed for a short time in a situation in which the object T_Dmax goes away from the vehicle M1, Position condition: An object T_Dmax is present in the third lane.

Relative speed condition: None

First and Second Examples

The basic LC time is changed in the extending direction (see Step S44 in FIG. 6).

When the basic LC time is changed in the extending direction, execution of lane change control can strongly emphasize the object T_Dmax in the third lane. Accordingly, a feeling of security that lane change control will be safely performed can be given to a driver.

4. Correspondence Between First Embodiment and Claims

In the above-mentioned embodiment, the vehicle control ECU 70 and the running mechanism ECU 80 correspond to a "running control device" in the claims. The GPS receiver 10, the map database 20, the external sensor 30, the internal sensor 40, the communication device 50, and the HMI unit 60 correspond to an "information acquiring device" in the claims. The LC time setting process corresponds to a "setting process" in the claims.

Second Embodiment

A second embodiment of the disclosure will be described below with reference to FIG. 10. In the following description, a difference from the first embodiment will be mainly described and details common to the first embodiment will be appropriately skipped.

1. Features of Automatic Driving System According to Second Embodiment

In the LC time setting process according to the first embodiment, the basic LC time BT is changed with attention paid to an object T_Dmax in the second lane or the third lane. In an LC time setting process according to the second embodiment, the basic LC time BT is changed with attention paid to a moving object in the first lane in addition to such an object T_Dmax.

2. Example of Change Determining Process

Figure 10:
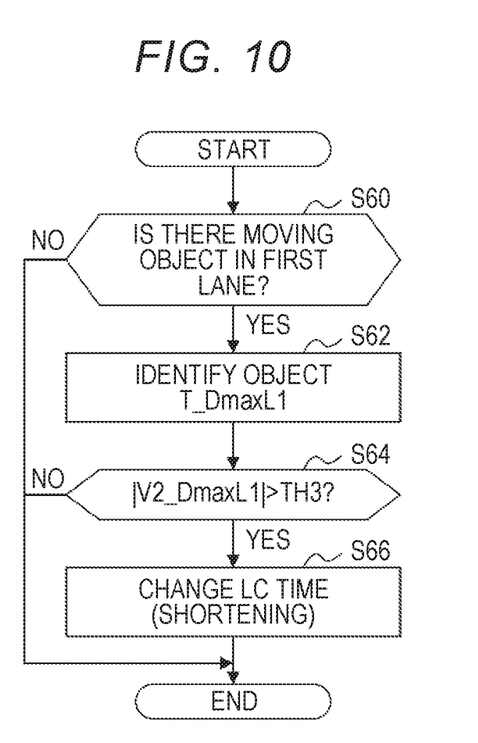
FIG. 10 is a flowchart illustrating a flow of an example of a change determining process according to a second embodiment of the disclosure.

FIG. 10 is a flowchart illustrating a flow of an example of a change determining process according to the second embodiment. In the change determining process, it is first determined whether there is a moving object in the first lane (Step S60). The determination of Step S60 is performed based on external sensor information. A range in the first lane which is determined in Step S60 is set based on the vehicle speed V1. When the determination result of Step S60 is negative, the change determining process ends.

When the determination result of Step S60 is positive, an object T_DmaxL1 is identified (Step S62). The object T_DmaxL1 is a moving object having the largest degree of approach D in the first lane. The degree of approach D is calculated using Equation (1) as described above.

After the object T_DmaxL1 has been identified, it is determined whether the absolute value |V2_DmaxL1| of the relative speed V2_DmaxL1 is greater than a third threshold value TH3 (Step S64). The relative speed V2_DmaxL1 is a relative speed of the vehicle M1 with respect to the object T_DmaxL1. When the absolute value |V2_DmaxL1| is greater than the third threshold value TH3, it means that a distance between the object T_DmaxL1 and the vehicle M1 decreases.

When the determination result of Step S64 is positive, the LC time is changed in the shortening direction (Step S66). This change is performed by multiplying the LC time by a predetermined correction factor $\lambda$ ($\lambda<1$). This LC time is set by the LC time setting process in the embodiment The correction factor $\lambda$ may be set to vary according to the vehicle speed V1.

3. Advantageous Effects

In the automatic driving system according to the second embodiment, the LC time is changed in the shortening direction by performing the change determining process. Accordingly, in a situation in which a distance between the object T_DmaxL1 and the vehicle M1 decreases, execution of lane change control can be completed before the distance L_DmaxL1 between the vehicle M1 and the object T_DmaxL1 decreases. As a result, a feeling of security that execution of lane change control will be rapidly completed can be given to a driver.

What is claimed is:

1. An automatic driving system that is mounted in a vehicle, comprising:
   an information acquiring device configured to acquire driving environment information indicating a driving environment of the vehicle; and
   a running control device configured to
   execute lane change control from a first lane to a second lane during automatic driving of the vehicle, and
   perform a setting process of setting a lane change time which is a time required for lane change based on the lane change control based on the driving environment information, wherein
   the running control device is configured to, in the setting process,
   set an initial value of the lane change time,
   determine whether a moving object having a highest degree of approach to the vehicle is present in the second lane, wherein the degree of approach of the moving object is calculated based on a distance from the vehicle to the moving object around the vehicle and a relative speed of the vehicle with respect to the moving object, and
   change the initial value based on a relative position of the moving object with respect to the vehicle and the relative speed of the vehicle with respect to the moving object when it is determined that the moving object having the highest degree of approach is present in the second lane,
   wherein in the setting process, the running control device is configured to determine whether the moving object is present in the first lane when the initial value has been changed, to determine whether an absolute value of the relative speed of the vehicle with respect to the moving object is greater than a third threshold value when it is determined that the moving object is present in the first lane, and to re-change the changed initial value in a shortening direction when it is determined that the absolute value is greater than the third threshold value.

2. The automatic driving system according to claim 1, wherein
   in the setting process, the running control device is configured to change the initial value in an extending direction when the relative position is behind the vehicle and the relative speed is greater than a first threshold value which is positive, and to change the initial value in the shortening direction when the relative position is behind the vehicle and the relative speed is negative.

3. The automatic driving system according to claim 1, wherein
   in the setting process, the running control device is configured to change the initial value in an extending direction when the relative position is in front of the vehicle and the relative speed is less than a second threshold value which is negative, and to change the initial value in the shortening direction when the relative position is in front of the vehicle and the relative speed is positive.

4. The automatic driving system according to claim 1, wherein
   in the setting process, the running control device is configured to change the initial value in the shortening direction when the relative position is behind the vehicle and the relative speed is greater than a first threshold value which is positive, and to change the initial value in the shortening direction when the relative position is behind the vehicle and the relative speed is negative.

5. The automatic driving system according to claim 1, wherein
   in the setting process, the running control device is configured to change the initial value in the shortening direction when the relative position is in front of the vehicle and the relative speed is less than a second threshold value which is negative, and to change the initial value in the shortening direction when the relative position is in front of the vehicle and the relative speed is positive.

6. The automatic driving system according to claim 1, wherein
   in the setting process, the running control device is configured to determine whether the moving object is present in a third lane which is adjacent to the second lane when it is determined that the moving object having the highest degree of approach is not present in the second lane and to change the initial value in an extending direction when it is determined that the moving object having the highest degree of approach is present in the third lane.

* * * * *